Aug. 31, 1948.  A. CECCHINI  2,448,417
ELECTRIC STOVE WITH UTENSIL RETAINING MEANS
Filed May 15, 1944  2 Sheets-Sheet 1
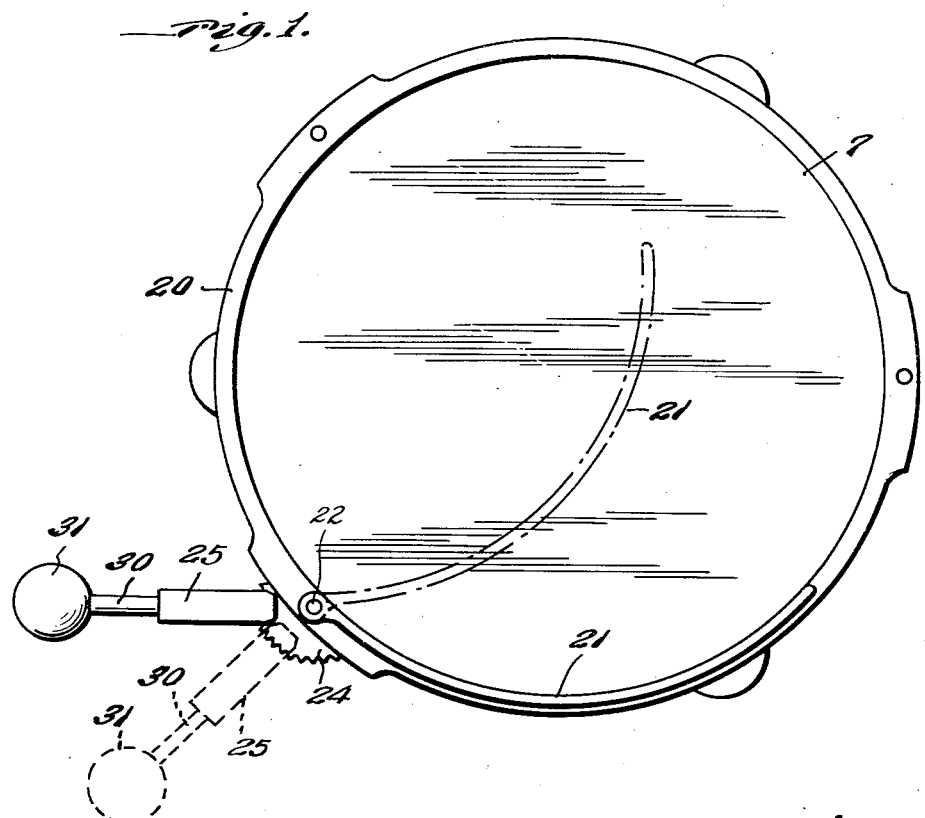
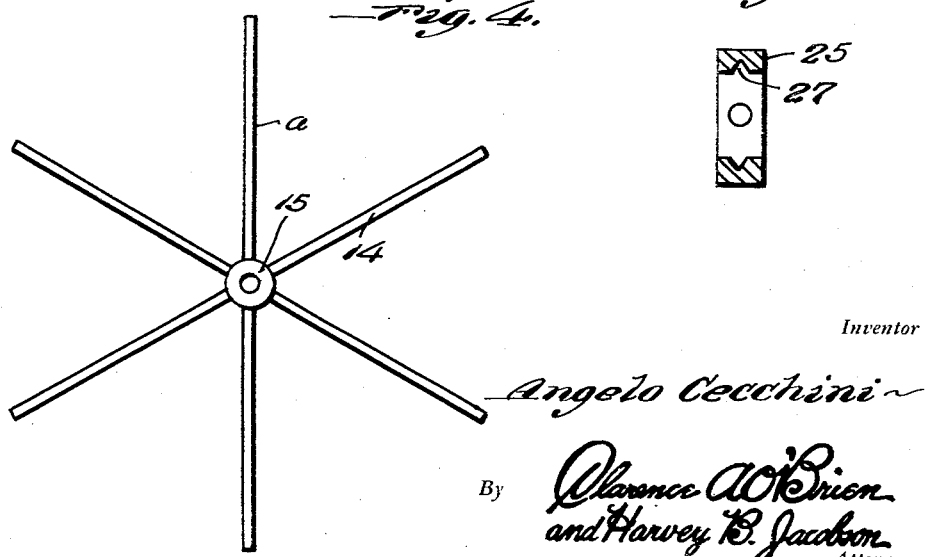
Inventor
Angelo Cecchini
By Clarence A. O'Brien
and Harvey B. Jacobson
Attorneys Aug. 31, 1948.  A. CECCHINI  2,448,417
ELECTRIC STOVE WITH UTENSIL RETAINING MEANS
Filed May 15, 1944  2 Sheets-Sheet 2

Inventor
Angelo Cecchini
By Clarence A. O'Brien
and Harvey B. Jacobson
Attorneys Patented Aug. 31, 1948

2,448,417

UNITED STATES PATENT OFFICE 2,448,417

ELECTRIC STOVE WITH UTENSIL RETAINING MEANS

Angelo Cecchini, Astoria, Long Island, N. Y.

Application May 15, 1944, Serial No. 535,664

1 Claim. (Cl. 126—24)

This invention relates to new and useful improvements in stoves of the electric type, the principal object being to provide an electric cooking stove especially adapted for use on moving vehicles such as boats, aircraft and land vehicles, especially trailers and, of course, railway rolling stock.

Another important object of the invention is to provide a cooking stove provided with means for retaining utensils on the stove top against being shifted off by the motion of the vehicle in which the stove is located.

Various other important objects and advantages of the invention will become apparent to the reader of the following description.

In the drawings:

Figure 1 represents a top plan view.

Figure 4 is a top plan view of the supporting spider.

Figure 5 is a cross-sectional view through the detent guide.

Figure 2:
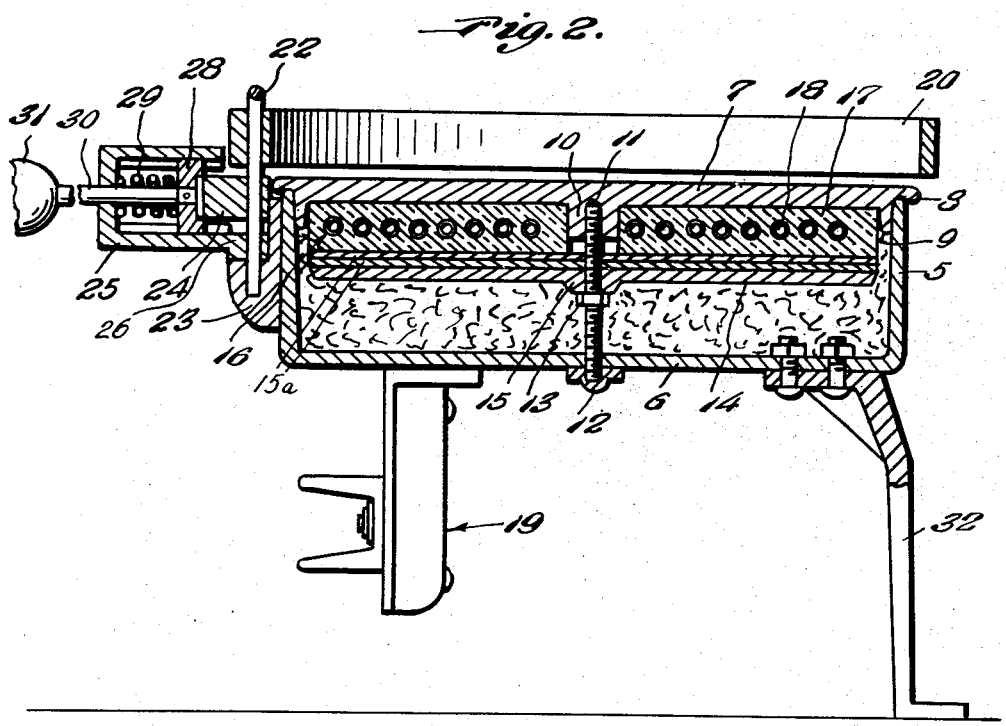
Figure 2 is a vertical sectional view.
Figure 3:
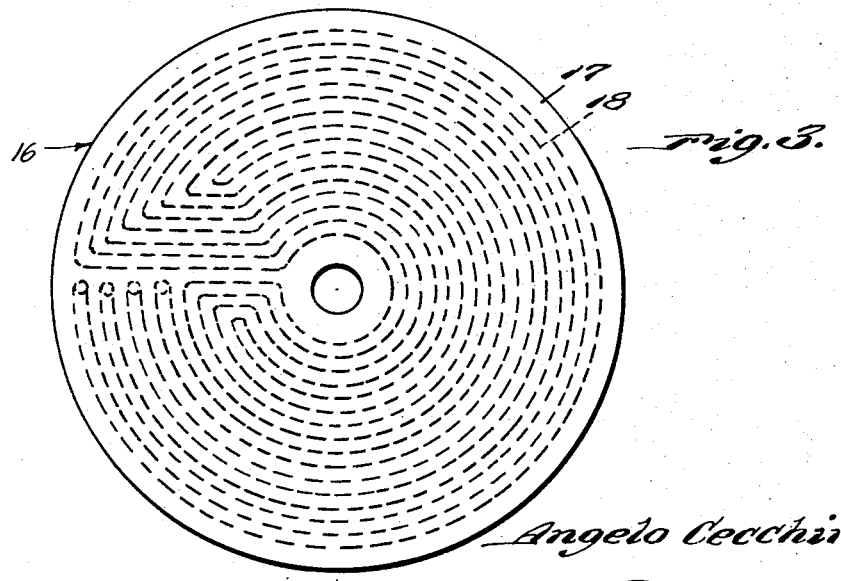
Figure 3 is a top plan view of the heating unit.

Referring to the drawings wherein like numerals designate like parts, it can be seen that numeral 5 denotes a cylindrical shell having a bottom 6, this shell is open at its top but has a disk-shaped hot plate 7 resting thereon. The hot plate has a lip 8 at its periphery resting on the upper edge of the shell 5 and an internal depending skirt 9 which fits snugly against the inside of the shell 5, as is clearly shown in Figure 2.

The central portion of the hot plate 7 has a depending burr 10 formed with an internal threaded bore to receive the upper end of a threaded vertical member 11, the lower end of this threaded member being disposed through an opening in the bottom 6 and provided there with a cap nut 12.

At the intermediate portion of the threaded member 11 is located a collar or nut 13 upon which a spider 14 is supported, this spider 14 consisting of a hub 15 and a plurality of radial arms a. A plate or plates 15a of heat insulating material are located on the spider 14 and upon these plates 15a rests a heating unit 16, which consists of a circular body 17 of refractory material in which is embedded one or more heating elements 18.

Obviously, by tightening the cap nut 12 the hot plate 7 can be firmly secured to the shell 5.

Numeral 19 denotes an outlet box for electrical connection between a supply line (not shown) and the heating unit 16.

Mounted above the hot plate 7 and concentric with the same is a band 20 which, of course, is intended to prevent slipping off of utensils from the hot plate 7.

To hold the utensils snugly in position against the band 20 to prevent any sliding movement of the utensils on the hot plate 7, an arcuate shaped arm 21 is provided. The arm 21 is carried at one end by a vertical shaft 22, the lower end of which is journaled in a boss 23 at the side of the shell 5.

A stationary ratchet block 24 of semi-circular shape is secured to the side of the shell 5 and has the vertical shaft 22 disposed vertically therethrough. Overlapping the ratchet block 24 is a horizontally disposed U-shaped guide 25, one leg portion which has an extension 26 which is secured to the shaft 22.

The U-shaped guide 25 has the opposed sides of its legs grooved as at 27 to receive a slide element or dog 28 having a beveled portion adapted to engage the teeth of the ratchet block 24.

Interposed between the slide block 28 in the outer end of the U-shaped guide 25 is a coiled compression spring 29 which is convoluted about a stem 30 which projects from the block 28 and extends slidably through the outer end of the guide 25. The outer end of the stem 30 has a hand knob 31.

Obviously, a pan can be placed on the hot plate 7 and pushed against the band 20, after which the knob 31 can be pulled outwardly and the slide 25 swung to bring the arcuate arm 21 into engagement with the utensil to hold the same steadily against the band 20. By releasing the knob 31, the dog 28 will engage the ratchet block 24 and hold the utensil engaging arm 21 against the utensil. Thus it will be seen, that the utensil will be firmly held upon the hot plate 7 and any motion of the vehicle in which the stove is located will not result in the upsetting of the utensil.

Numeral 32 denotes one of the legs for the stove and to prevent the conductivity of heat to this leg, the upper portion may be insulated from the shell 5 or grooved to reduce metal to metal contact.

Obviously, the parts of this invention, namely, the annulus and the curved retaining arm may be used on cookstoves and other types of stoves for holding utensils in place. As a matter of fact, these improvements can be easily installed on the conventional stoves now used on ships and other vehicles regardless of whether the stove is an electric heated stove or wherein heat is produced in some other manner.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a stove including a hot plate, and a shell supporting said plate and provided with a side boss thereon, an annular band above said plate concentric thereto and adapted to prevent cooking utensils from sliding off said plate, an upright shaft rotatably mounted in said boss, an arcuate arm fastened at one end on said shaft above said band for rotation by the shaft to clamp said utensils against the band, and manipulative means to rotate said shaft into different set positions comprising a U-shaped guide fixed on said shaft and swingable laterally to rotate the shaft, a manipulative stem extending out of said guide for grasping to swing said guide and being endwise slidable in said guide, a fixed ratchet block concentric to said shaft and straddled by said guide, and a dogging block slidable in said guide by endwise sliding of said stem into and from interlocking engagement with said ratchet block.

ANGELO CECCHINI.

REFERENCES CITED

The following references are of record in the file of this patent:

UNITED STATES PATENTS

| Number | Name | Date |
|---|---|---|
| 681,982 | Savage | Sept. 3, 1901 |
| 1,034,810 | Madsen | Aug. 6, 1912 |
| 1,120,884 | Ayer | Dec. 15, 1914 |
| 1,371,407 | Berglann | Mar. 15, 1921 |
| 1,645,466 | Westlake | Oct. 11, 1927 |
| 1,662,751 | Rochelle | Mar. 13, 1928 |
| 1,810,650 | Fay | June 16, 1931 |